Feb. 7, 1967  R. E. ISBELL  3,302,996
PROCESS FOR PREPARING CYANOGEN
Filed Jan. 27, 1965
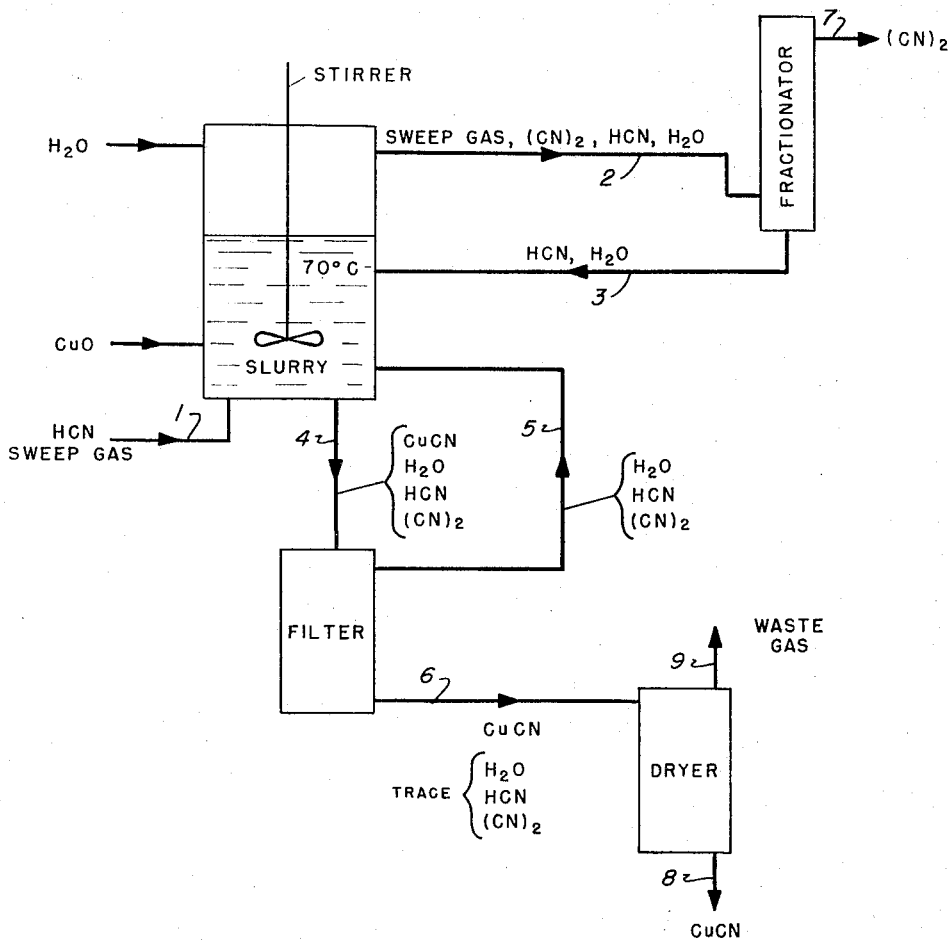
Raymond E. Isbell INVENTOR.
BY Robert A. Petrusek
Agent

United States Patent Office 3,302,996
Patented Feb. 7, 1967

3,302,996
PROCESS FOR PREPARING CYANOGEN
Raymond E. Isbell, Sheffield, Ala., assignor to Tennessee Valley Authority, a corporation of the United States
Filed Jan. 27, 1965, Ser. No. 428,583
7 Claims. (Cl. 23—151)

The invention herein described may be manufactured and used by or for the Government for governmental purposes without payment to me of any royalty thereon.

This application is a continuation-in-part of my application Serial No. 222,741, filed September 10, 1962 and now abandoned.

My invention relates to a method for the manufacture of cyanogen, and more particularly to a method for the preparation of cyanogen wherein hydrogen cyanide is converted into the desired material by the action of cupric copper, said conversion of hydrogen cyanide being carried out within the temperature range from about 50° C. to about 90° C.

Heretofore it has been the practice in the chemical industry to produce cyanogen by dehydrating ammonium oxalate or oxamide with phosphorus pentoxide; by treating an aqueous solution of sodium or potassium cyanide with copper sulfate; by thermally decomposing mercuric cyanide, silver cyanide, or auric cyanide; and by dehydrating glyoxime with acetic acid.

More recent practices in the chemical industry for preparing cyanogen relate to the reaction of hydrogen cyanide with chlorine gas, wherein hydrogen chloride and cyanogen are evolved at a temperature in the range from about 200° to 1000° C. These prior-art methods for the preparation of cyanogen are characterized by requiring complex reagents and/or involving special operating conditions of temperature and/or pressure. Where strong oxidizing agents are used, such as manganese dioxide, potassium permanganate, chlorine and the like, undesirable byproducts are often formed. Thus, for example, oxidation of hydrogen cyanide with potassium permanganate causes the reduction of the permanganate and the formation of manganous ions in the reaction solution, and these manganous ions must be removed if the process is to be continuous. The problem of such removal engenders time-consuming and expensive steps. Often, in the case of other similar oxidizing agents, the removal is not only time-consuming but very difficult to perform. Moreover, yields of cyanogen obtained from hydrogen cyanide or hydrocyanic acid by such prior-art methods are, in general, quite low. Still another drawback in the use of the common oxidizing agents is that the oxidizing agent is destroyed in the reaction and may not be regenerated in a simple manner.

A fairly recent disclosure for the preparation of cyanogen is shown in U.S. Letters Patent 2,841,472, Fierce et al., July 1, 1958. Fierce et al. discloses a method for the preparation of cyanogen wherein hydrogen cyanide is oxidized by an aqueous slurry of cupric oxide at room temperature to yield approximately one-fourth of the cyanide as cyanogen and the remaining three-fourths of the cyanide as a copper cyanide complex residue. According to Fierce et al., the copper cyanide complex residue is filtered and air-dried before heating to approximately 150° C. in an inert atmosphere, wherein it decomposes to yield cuprous cyanide and another one-fourth of the original cyanide as cyanogen. The cuprous cyanide is subsequently oxidized at approximately 450° C. by moist air to regenerate the starting material, cupric oxide.

My invention is directed to a process for producing cyanogen from hydrogen cyanide by a method which improves on the teachings of the above-mentioned Fierce et al. patent.

In the Fierce et al. disclosure, hydrogen cyanide is oxidized at room temperature by cupric oxide in an aqueous slurry to yield one-fourth of the cyanide as cyanogen and three-fourths of the cyanide as a copper cyanide complex residue. This residue is then filtered and air-dried before heating in an inert atmosphere wherein it decomposes to yield cuprous cyanide and another one-fourth of the original cyanide as cyanogen. In the Fierce et al. process, the equations for the reactions are as follows:

(1) $8HCN + 4CuO \rightarrow (CN)_2 + 2Cu[Cu(CN)_3] + 4H_2O$ (2) 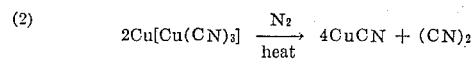

I have found in studying the Jacquemin process for producing cyanogen from sodium cyanide and cupric sulfate according to the equation (3) $8NaCN + 4CuSO_4 \rightarrow (CN)_2 = 2Cu[Cu(CN)_3] + 4Na_2SO_4$ that the complex compound which is identical to the compound formed by Fierce et al. [see Equation 1] from hydrogen cyanide and cupric oxide is unstable above about 50° C. The complex compound is green but on heating it in aqueous medium to 50° C., it decomposes to yield cyanogen and cuprous cyanide, a tan-colored compound. I have found that even at room temperature the complex decomposes slightly. Thus, at room temperature, the yield of cyanogen from cupric sulfate and sodium cyanide based on equation (3) is 112 percent, indicating that some of the complex has decomposed to yield cyanogen and cuprous cyanide. If the reaction is run at 70° to 75° C., however, the complex does not form and the equation for the reaction is (4) $4NaCN + 2CuSO_4 \rightarrow (CN)_2 + 2CuCN + 2Na_2SO_4$ and the yield based on Equation 4 is 93 percent. If the reaction is run at room temperature until evolution of cyanogen ceases and then the reaction medium is heated to 75° C., more cyanogen evolves to give a total yield of cyanogen of 84 percent based on Equation 4.

I was thus led to try the process of Fierce et al. at above 50° C. and have found that no complex forms when the temperature is held above 50° C. The claim of Fierce et al. that the reaction as shown in Equation 1 may take place up to 65° C. appears to be erroneous since in my studies I have found that the complex is unstable and cannot form above about 50° C. I can therefore obtain one-half of the starting hydrogen cyanide as cyanogen if the slurry is kept above about 50° C. The reaction for my improved method for the preparation of cyanogen can be simplified as follows:

(5) $4HCN + 2CuO \rightarrow (CN)_2 + 2CuCN + 2H_2O$

I have therefore overcome the difficulties inherent in the processes of the type of the prior art to a substantial extent in the present invention by a process in which hydrogen cyanide and cupric oxide are allowed to react in an aqueous medium at a temperature in the range of 50° to 90° C., thereby eliminating the steps of filtering, drying, and heating in an inert atmosphere to decompose the complex. The reaction of my invention has been found to proceed smoothly and one-half of the hydrogen cyanide is directly converted to cyanogen in a one-step process. Furthermore, several new and advantageous features over the conventional procedure for the production of cyanogen are realized by the present invention.

Among these advantageous features are a one-step process for the production of cyanogen from hydrogen cyanide wherein a recovery of the original cyanide as cyanogen is increased as much as 100 percent over the recovery in prior-art processes, and which process is further characterized by the fact that it does not require complex reagents or involve special operating pressures. Furthermore, air is a satisfactory gas for sweeping cyanogen from the reaction mixture eliminating the necessity of commercial gases. Other gases such as, for example, nitrogen, helium, or carbon dioxide which are not readily acted on by the chemicals present during the reaction may be used to sweep the products from the reactor.

It therefore an object of the present invention to provide a process for the economical and more direct production of cyanogen from hydrogen cyanide.

Another object of the present invention is the preparation of cyanogen from hydrogen cyanide through the use of a readily available reagent which is reconstituted or converted to an equally effective reagent during the process.

A further object of the present invention is the preparation of cyanogen from hydrogen cyanide by reaction with a cupric ion-containing reagent with subsequent regeneration to a cupric ion-containing reagent.

A still further object of the present invention is to provide a simple and efficient method for preparing cyanogen in high yields without the use of elevated pressures.

A still further object of the present invention is to react hydrogen cyanide in aqueous solution at atmospheric pressure and a temperature in the range of 50° to 90° C. with a cupric ion-containing reagent to form cyanogen and cuprous cyanide.

Another object of the present invention is to prepare cyanogen by oxidizing hydrogen cyanide with an aqueous slurry of cupric oxide.

A further object of the present invention is to prepare cyanogen in good yields from hydrogen cyanide and cupric oxide without the formation of a copper-cyanide complex compound.

Still another object is to prepare cyanogen from hydrogen cyanide and cupric oxide with air as a sweeping gas.

Yet another object of this invention is the preparation of cyanogen by allowing hydrogen cyanide to react with a slurry of cupric oxide without the use of elevated pressures.

Another object of the present invention is to prepare cyanogen from hydrogen cyanide and cupric oxide with no significant loss of copper.

In carrying out the objects of the present invention in one form thereof, I formed cyanogen from hydrogen cyanide by allowing the hydrogen cyanide and cupric oxide to react in an aqueous medium at a temperature between 50° and 90° C., with the result that one-half of the original hydrogen cyanide is directly converted to cyanogen in my one-step process.

My invention, together with further objects and advantages thereof, will be better understood from a consideration of the following description taken in connection with the accompanying drawing in which:

The drawing is a flowsheet illustrating the principles of my novel one-step process which results in the direct production of cyanogen from hydrogen cyanide.

Referring now more specifically to the drawing, there is shown in flowsheet form a process which may be operated batchwise or continuously. In continuous operation two or more reactors may be operated in a cascade arrangement in which the slurry of cupric oxide is moved countercurrent to the flow of input hydrogen cyanide. The aqueous slurry is maintained at 50° to 90° C., preferably 70° to 75° C., and is stirred vigorously to produce a uniform suspension of cupric oxide. The slurry may contain as much as 3.0 grams of cupric oxide per milliliter. In the embodiment shown in the drawing, hydrogen cyanide is charged through line 1 to the slurry by bubbling a suitable sweep gas, usually air, through liquid hydrogen cyanide at a temperature necessary to produce the desired air-hydrogen cyanide ratio. When the liquid hydrogen cyanide is maintained at 0° C., the inlet gases normally contain about 35 percent hydrogen cyanide vapor. At this concentration hydrogen cyanide reacts completely when added at about 0.25 percent of theory per minute. Reaction begins immediately and the exhaust gases—containing mostly air, cyanogen, and water vapor—pass through line 2 to the fractionator. As cyanogen passes to storage through line 7, a hydrocyanic acid solution passes from the fractionator through line 3 to the reaction vessel.

The cuprous cyanide formed during the reaction is removed through line 4 along with part of the aqueous solution which contains some hydrogen cyanide and cyanogen. After filtration this solution is returned to the reaction vessel through line 5 and cuprous cyanide is transported to the dryer through line 6. Traces of hydrogen cyanide, cyanogen, and water vapor are allowed to waste.

The dried cuprous cyanide may be heated according to the process of Vancheri and Mackay (U.S. Patent 2,957,751, October 25, 1960) to obtain copper metal and the remainder of the original cyanide as cyanogen. The copper metal can be readily oxidized at 900° C. by moist air to give cuprous oxide, which in turn can be oxidized at 450° C. by air to cupric oxide for re-use in the process.

In order that those skilled in the art may better understand how the present invention can be practiced and more fully and definitely understood, the following examples of the process which I have used in the direct production of cyanogen of the character indicated here is given by way of illustration and not by way of limitation.

*Example I*

Through a vigorously stirred slurry of 20.0 grams of cupric oxide in 200 milliliters of water was passed a gaseous stream of HCN by bubbling air through liquid hydrogen cyanide held at 0° C. in an ice bath. The gas stream was passed at approximately 230 milliliters per minute and contained 30 to 35 percent HCN. The slurry was contained in a 2 by 8 inch test tube equipped with a gas inlet and gas outlet tube and was maintained at 70° to 75° C. throughout the reaction. The reaction was interrupted periodically to wash down the solid material which formed a ring on the walls of the reaction vessel above the suspension. The data for this reaction are shown in run 5 of Table I. When the required amount of hydrogen cyanide had been added, the reaction was stopped and the residue consisting of cyprous cyanide and any unaltered cupric oxide was filtered and air-dried for further use.

*Example II*

Additional small-scale tests were carried out as in Example I above. The conditions of operation and results thereof are as indicated in the following table.

TABLE I

| Run No. | Temp., °C. | CuO, charge, g. | Percent of theoretical HCN charged | Composition of charge gas, cc./min. | | CuCN [a] recovered, percent of theory | $(CN)_2$ [b] selectivity | Yield $(CN)_2$, [b] percent |
|---|---|---|---|---|---|---|---|---|
| | | | | Air | HCN | | | |
| 2 | 74 | 20.0 | 38.8 | 150 | 80 | | 104 | 97.6 |
| 3 | 75 | 20.0 | 78.9 | 138 | 72 | 79 | 102 | 98.5 |
| 4 | 73 | 40.0 | 93.7 | 270 | 116 | 86 | 103 | 99.0 |
| 5 | 73 | 40.0 | 99.3 | 142 | 67 | 96 | 100 | 99.0 |
| 6 | to 90 | 40.0 | 49.6 | 100–195 | 50–105 | 95 | [c] 88 | 74.7 |
| 7 | 73 | 40.0 | 93.0 | 140 | 64 | 96 | 92 | 85.7 |
| 8 | 73 | 20.0 | 146.0 | 182 | 82 | 97 | 98 | 67.8 |

[a] Copper determined electrolytically and cyanide determined by distilling HCN from CuCN in HCl and disodium ethylenediamine tetraacetate with subsequent titration of the cyanide according to the Deniges modification of the Liebig method.
[b] Determined from chromatographic analysis of hydrogen cyanide and cyanogen and from the wet analysis for hydrogen cyanide and cyanogen according to the method of Rhodes; yield based on HCN and equation (3).
[c] Some $CO_2$ forms above about 80° C.

Example III

Other information concerning the chemistry of my invention may be seen from Table II, infra. When cupric oxide was available throughout the run (i.e., a deficiency of hydrogen cyanide was charged), virtually all the hydrogen cyanide was converted to cyanogen. In runs 1 and 5, 53.1 and 49.3 percent, respectively, of the cyanide was recovered as cyanogen compared to a theoretical value of 50 percent.

In run 2 in which an excess of hydrogen cyanide was charged at a rate of 0.65% S/min. (percent S/min.=percent of the stoichiometric requirement per minute) almost all (96.5%) of the cupric oxide was converted to cuprous cyanide.

The results given in Table III show that when hydrogen cyanide is charged at 0.27% S/min., the reaction is quantitative until virtually all of the cupric oxide is converted to cuprous cyanide. At 0.53% S/min., the reaction is quantitative until about one-half of the cupric oxide is converted and at 1.06% S/min., all of the hydrogen cyanide was not consumed even at the beginning of the run. Rates higher than 1.06% S/min. may be used but high rates necessitate the recovery of large quantities of hydrogen cyanide for recycling.

When twice the stoichiometric amount of hydrogen cyanide was charged to cupric oxide at the beginning of the experiment, it was found that cyanogen was formed at an almost constant rate until all of the cupric oxide was expended. The cupric oxide was expended at a rate of about 1 percent per minute.

Although most of my work has been in aqueous medium, other solvents which are not readily oxidized by cupric oxide and in which hydrogen cyanide is soluble are considered as within the scope of this invention.

TABLE III.—UTILIZATION OF CUPRIC OXIDE WITH STOICHIOMETRIC AMOUNT OF HYDROGEN CYANIDE

[40.0 g. CuO suspended in 200 ml. $H_2O$; temperature 70° to 73° C.; charge rate HCN, 0.27% S/min.]

| Time, min. | HCN added, percent [a] | Fraction, percent, of CuO converted to CuCN [b] |
|---|---|---|
| 227 | 62.3 | 65.9 |
| 262 | 71.8 | 70.6 |
| 322 | 88.5 | 91.0 |
| 360 | 99.3 | [c] 96.0 |

[a] 100 percent is that required by the equation $4HCN+2CuO=2CuCN+C_2N_2+2H_2O$.
[b] Determined by chemical analysis of the residual solids.
[c] Microscopic examination indicated that 99 percent of the CuO had been converted to CuCN.

While I have shown and described particular embodiments of my invention, modifications and variations thereof will occur to those skilled in the art. I wish it to be understood, therefore, that the appended claims are intended to cover such modifications and variations which are within the true scope and spirit of my invention.

I claim as my invention:

1. In a process for the preparation of cyanogen in which a cupric ion-releasing reagent is contacted in aqueous medium in a reaction zone with a water soluble cyanide ion-releasing reagent to form cyanogen and byproduct material, the improvement in combination therewith yielding substantially 50 percent of the original cyanide in said water-soluble cyanide ion-releasing agent directly as cyanogen and a byproduct, cuprous cyanide material, in a single step, wherefrom said byproduct cuprous cyanide material substantially the remaining 50 percent of the original cyanide in said water-soluble cyanide ion-releasing agent is recovered by reduction of same to cop-

TABLE II.—CYANOGEN FROM HYDROGEN CYANIDE AND CUPRIC OXIDE

[CuO suspended in 200 ml. of water; temperature, 71° to 77° C.; input gas, 30 to 35% HCN]

| Run No. | Charge, grams CuO | Input gas, cc./min. | Time, min. | Percent S/min. | HCN, percent [a] | Distribution, percent, of N | | | | Percent N recovered |
|---|---|---|---|---|---|---|---|---|---|---|
| | | | | | | Suspension | | Effluent gas | | |
| | | | | | | Solid residue | In soln. | $C_2N_2$ | HCN | |
| 9 | 20 | 210 | 140 | 0.55 | 76.6 | 50.5 | 1.5 | 53.1 | 0.4 | 105.5 |
| 10 | 20 | 264 | 225 | 0.65 | 146.0 | 32.4 | 1.3 | 34.0 | 30.5 | 98.2 |
| 11 | 20 | 384 | 125 | 0.98 | 123.0 | 33.4 | 13.5 | 29.3 | 23.8 | 100.0 |
| 12 | 40 | 220 | 345 | 0.31 | 106.0 | 45.1 | 4.1 | 46.5 | 2.4 | 98.1 |
| 13 | 40 | 386 | 200 | 0.47 | 93.7 | 45.4 | 0.9 | 49.3 | 4.4 | 100.0 |

[a] Stoichiometric HCN is the amount required by the reaction $4HCN+2CuO=2CuCN+C_2N_2+2H_2O$.

per metal and cyanogen in a subsequent step which improvement comprises the steps of contacting in a reaction vessel an aqueous suspension of cupric oxide with hydrogen cyanide; maintaining the reactants in said reaction vessel at a temperature in the range from about 50° C. to about 90° C. whereby the formation of cyanogen and cuprous (I) cyanide is effected through the contacting of said aqueous slurry of cupric oxide with said hydrogen cyanide within said temperature range; simultaneously introducing into said reaction vessel a sweep gas; simultaneously exhausting from said reaction vessel exhaust gases to a fractionating vessel, said exhaust gases containing substantially said sweep gas, cyanogen, and water vapor; separating as product in said fractionating vessel cyanogen and returning the remainder of said exhaust gas from said fractionating vessel to said reaction vessel; simultaneously removing from said reaction vessel a portion of the reacted slurry and introducing same into a filtering vessel; removing from said filtering vessel cuprous (I) cyanide as byproduct and returning the resulting filtrate from said filtering vessel to said reaction vessel, and said improved process being characterized by the fact that about one-half of the original cyanide is converted in one step of said process in said reaction vessel to cyanogen and that the other half of the original cyanide is directly converted in said one step of said process in said reaction vessel to solid byproduct cuprous (I) cyanide wherefrom the other half of the original cyanide may be subsequently recovered by reducing same to copper metal and cyanogen.

2. The process of claim 1 in which the temperature of the reactants in said reaction vessel is maintained in the range from about 70° C. to about 75° C.

3. The process of claim 1 in which the rate of introduction of hydrogen cyanide to said reaction vessel to thereby contact said aqueous slurry of cupric oxide is controlled in the range from about 1 percent to about 5 percent of the theoretical stoichiometric requirement per minute.

4. The process of claim 1 in which the rate of introduction of hydrogen cyanide to said reaction vessel to thereby contact said aqueous slurry of cupric oxide is controlled in the range from about 0.2 percent to about 0.5 percent by weight of the stoichiometric amount per minute.

5. The process of claim 1 in which the aqueous slurry of cupric oxide contains in the range from about 0.01 gram to about 3.0 grams of cupric oxide per milliliter of said slurry.

6. The process of claim 1 in which the aqueous slurry of cupric oxide contains in the range from about 0.05 gram to about 0.25 gram of cupric oxide per milliliter of said slurry.

7. The process of claim 1 in which the sweep gas introduced into said reaction vessel is a gas characterized by its non-reacting nature with the components in said reaction vessel and is selected from the group comprising air, nitrogen, carbon monoxide, carbon dioxide, helium, and mixtures thereof.

References Cited by the Examiner
UNITED STATES PATENTS
2,841,472  7/1958  Fierce et al. _____ 23—151

OSCAR R. VERTIZ, *Primary Examiner.*

EARL C. THOMAS, *Examiner.*